United States Patent
Sonokawa

(10) Patent No.: US 9,316,119 B2
(45) Date of Patent: Apr. 19, 2016

(54) TURBOMACHINE SECONDARY SEAL ASSEMBLY

(75) Inventor: Masayoshi Sonokawa, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 205 days.

(21) Appl. No.: 13/234,101

(22) Filed: Sep. 15, 2011

(65) Prior Publication Data

US 2013/0069313 A1 Mar. 21, 2013

(51) Int. Cl.
*F01D 25/18* (2006.01)
*F01D 11/00* (2006.01)
*F16J 15/44* (2006.01)

(52) U.S. Cl.
CPC .......... *F01D 25/183* (2013.01); *F01D 11/003* (2013.01); *F16J 15/441* (2013.01); *F05D 2240/58* (2013.01)

(58) Field of Classification Search
USPC .......... 277/348, 416, 422, 447, 448, 579, 909
See application file for complete search history.

(56) References Cited

U.S. PATENT DOCUMENTS

| | | | | |
|---|---|---|---|---|
| 3,271,037 A | * | 9/1966 | Hammond | 277/544 |
| 3,575,424 A | * | 4/1971 | Taschenberg | 277/411 |
| 4,289,264 A | * | 9/1981 | Rawlins | 277/460 |
| 4,405,134 A | * | 9/1983 | Sargent et al. | 277/422 |
| 4,471,964 A | * | 9/1984 | Kotzur | 277/347 |
| 4,555,117 A | * | 11/1985 | Kotzur | 277/348 |
| 4,749,199 A | * | 6/1988 | Gresh | 277/362 |
| 4,763,904 A | * | 8/1988 | Martinie | 277/348 |
| 5,066,029 A | * | 11/1991 | Gill | 277/328 |
| 5,174,584 A | * | 12/1992 | Lahrman | 277/400 |
| 5,284,347 A | * | 2/1994 | Pope | 277/305 |
| 5,299,813 A | * | 4/1994 | McKenna | 277/422 |
| 5,769,604 A | * | 6/1998 | Gardner et al. | 415/170.1 |
| 5,971,400 A | * | 10/1999 | Turnquist et al. | 277/416 |
| 6,142,729 A | * | 11/2000 | Tran et al. | 415/113 |
| 6,145,840 A | * | 11/2000 | Pope | 277/348 |
| 6,170,831 B1 | | 1/2001 | Bouchard | |
| 6,318,728 B1 | * | 11/2001 | Addis et al. | 277/355 |
| 6,471,213 B1 | * | 10/2002 | Yuri et al. | 277/355 |
| 6,655,695 B1 | | 12/2003 | Sund et al. | |
| 6,722,850 B2 | * | 4/2004 | Burdgick | 415/230 |

(Continued)

FOREIGN PATENT DOCUMENTS

| | | |
|---|---|---|
| EP | 1783329 | 5/2007 |
| EP | 2060742 | 5/2009 |

(Continued)

OTHER PUBLICATIONS

European Search Report for European Patent Application No. 12184058.1 completed Jan. 8, 2013.

*Primary Examiner* — Vishal Patel
*Assistant Examiner* — L. Susmitha Koneru
(74) *Attorney, Agent, or Firm* — Carlson, Gaske & Olds, P.C.

(57) ABSTRACT

An exemplary turbomachine secondary ring seal assembly includes a base portion that extends circumferentially about an axis and a protrusion extending from the base portion toward the axis. The protrusion has a sealing surface that contacts a support to limit movement of a fluid from a first axial side of the base portion to a second opposite axial side of the base portion. The sealing surface faces the axis. The sealing surface may also face in a radial direction.

21 Claims, 5 Drawing Sheets

(56) References Cited

U.S. PATENT DOCUMENTS

| | | | |
|---|---|---|---|
| 7,320,468 B2 * | 1/2008 | Morgan | 277/422 |
| 7,374,211 B2 * | 5/2008 | Reifschneider et al. | 285/281 |
| 7,540,501 B2 * | 6/2009 | Flaherty | 277/399 |
| 7,726,661 B2 * | 6/2010 | Orlowski et al. | 277/412 |
| 7,946,590 B2 | 5/2011 | Dobek et al. | |
| 8,091,897 B2 * | 1/2012 | Giard | 277/370 |
| 8,091,898 B2 * | 1/2012 | Garrison | 277/399 |
| 2001/0052673 A1 * | 12/2001 | Okumachi et al. | 277/348 |
| 2007/0235946 A9 * | 10/2007 | Garrison et al. | 277/411 |
| 2009/0071167 A1 * | 3/2009 | Benz et al. | 60/796 |
| 2009/0230628 A1 | 9/2009 | Dobek et al. | |
| 2010/0223790 A1 | 9/2010 | Thompson et al. | |
| 2011/0200427 A1 * | 8/2011 | Corten et al. | 415/170.1 |
| 2011/0215530 A1 * | 9/2011 | Vasagar et al. | 277/309 |

FOREIGN PATENT DOCUMENTS

| | | |
|---|---|---|
| EP | 1921276 | 10/2012 |
| GB | 2218475 | 11/1989 |
| GB | 2264541 | 9/1993 |

* cited by examiner

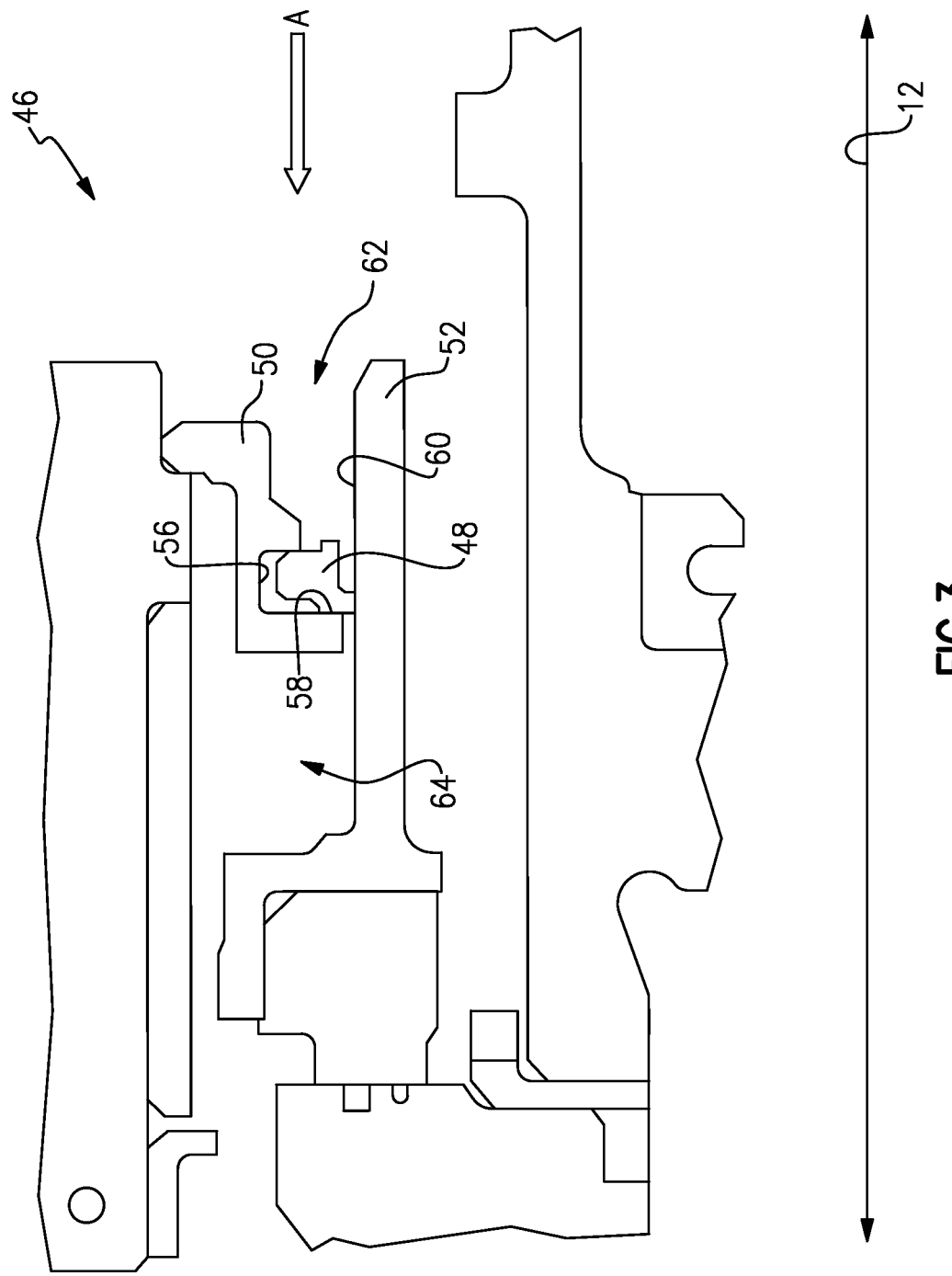

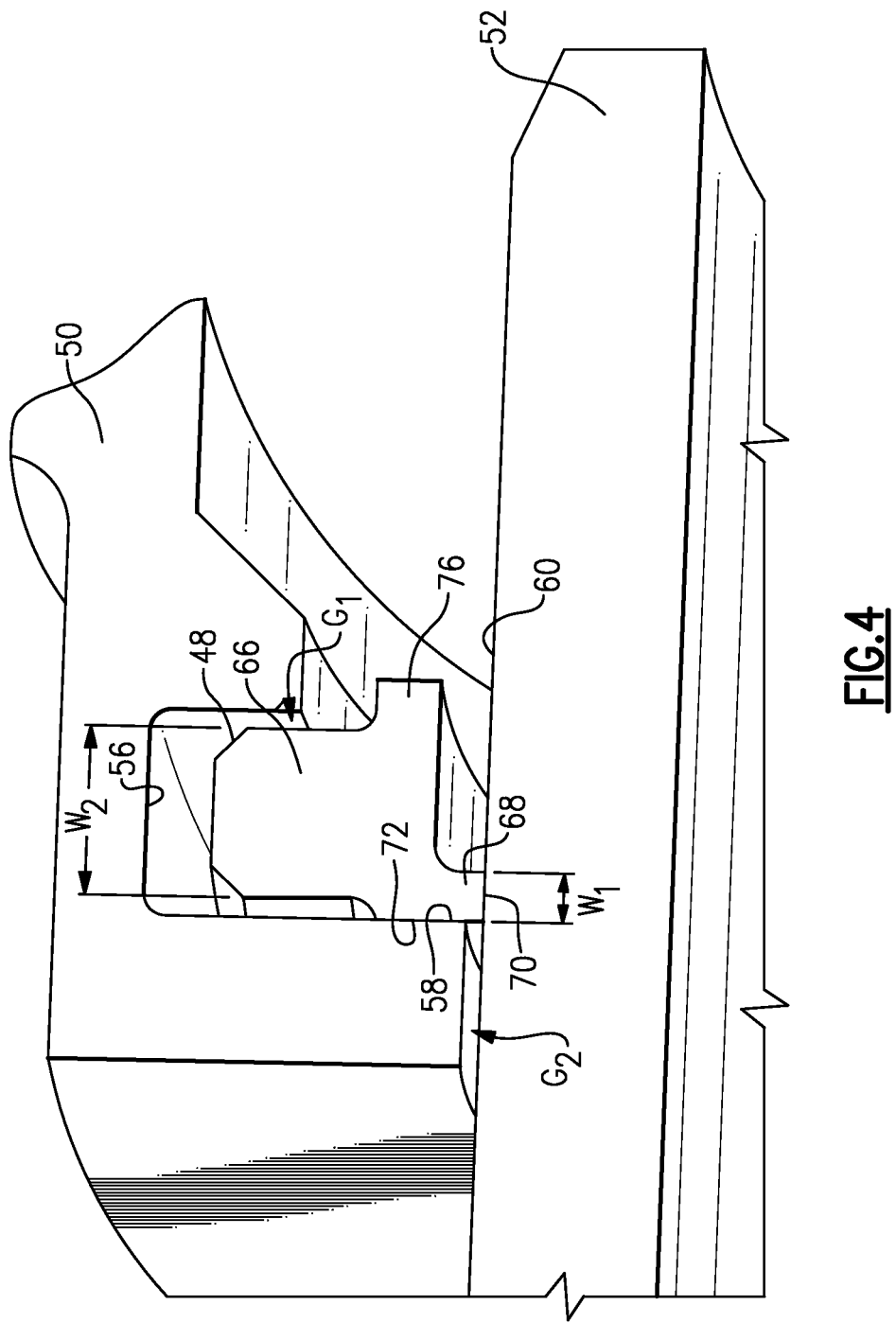

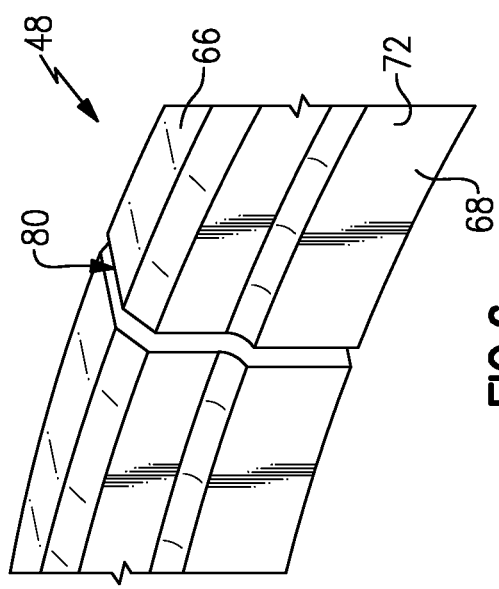
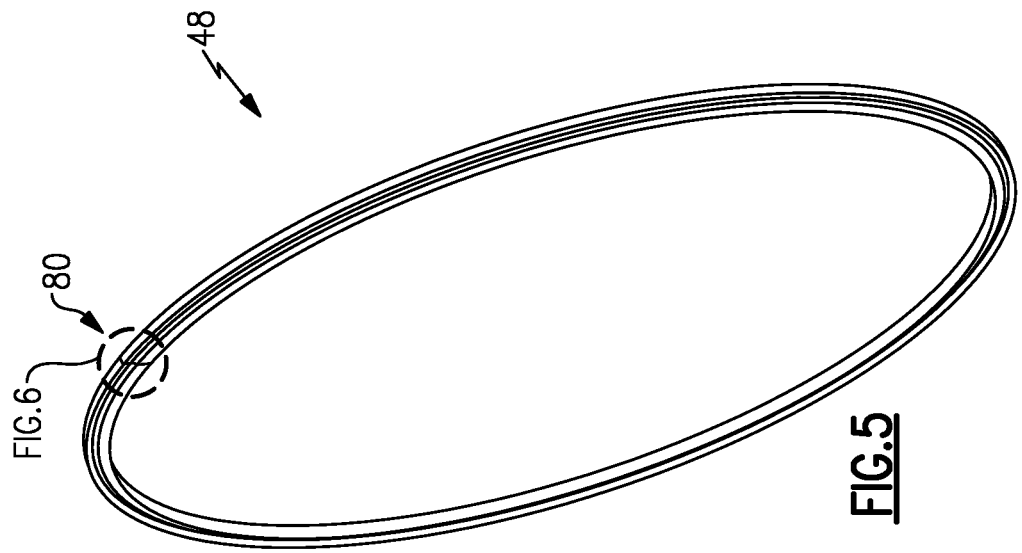

TURBOMACHINE SECONDARY SEAL ASSEMBLY

BACKGROUND

This disclosure relates generally to a turbomachine and, more particularly, to sealing areas of a turbomachine bearing compartment using a secondary seal.

Turbomachines are well known. Turbomachines typically include a fan section, a compressor section, a combustor section, a turbine section, and an exhaust section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections.

Seals limit movement of fluids, such as air/oil, within the turbomachines. Some seals are located within a bearing compartment of the turbomachine. For example, secondary ring seals, such as a piston ring or C-seal, are often used to limit movement of air/oil in and out of a bearing compartment, and air from opposing sides of the bearing compartment. Limiting movement of the relatively hot air into the bearing compartment helps maintain the temperature of the bearing compartment at a desired level. The complicated supports that hold such seals are large and heavy.

SUMMARY

An exemplary turbomachine secondary ring seal assembly includes a base portion that extends circumferentially about an axis and a protrusion extending from the base portion toward the axis. The protrusion has a sealing surface that contacts a support to limit movement of a fluid from a first axial side of the base portion to a second opposite axial side of the base portion. The sealing surface faces the axis. The sealing surface may also face in a radial direction.

An exemplary turbomachine secondary seal assembly includes a first support that establishes secondary seal axial location and a second support radially inboard the secondary seal. An exemplary secondary seal has two base contact faces. One face contacts the first support due to air pressure differences. Another face is biased to contact radially inboard due to self-contracting of the seal ring itself and/or air pressure differences. These two contact faces restrict flow of air in and out of the bearing compartment, and oil out of the bearing compartment.

An exemplary turbomachine sealing method includes positioning a seal at least partially within a circumferential groove of a first support and biasing the seal radially inward against a second support assembly using a pressurized fluid. The method limits flow of a fluid using the seal.

DESCRIPTION OF THE FIGURES

The various features and advantages of the disclosed examples will become apparent to those skilled in the art from the detailed description. The figures that accompany the detailed description can be briefly described as follows:

FIG. 3 shows a close-up view of an example secondary ring seal assembly within the FIG. 2 bearing compartment.

FIG. 4 shows a close-up perspective view of the FIG. 3 seal assembly.

FIG. 5 shows a perspective view of the FIG. 3 seal.

FIG. 6 shows a close-up view of a gap in the FIG. 5 seal.

DETAILED DESCRIPTION

Figure 1:
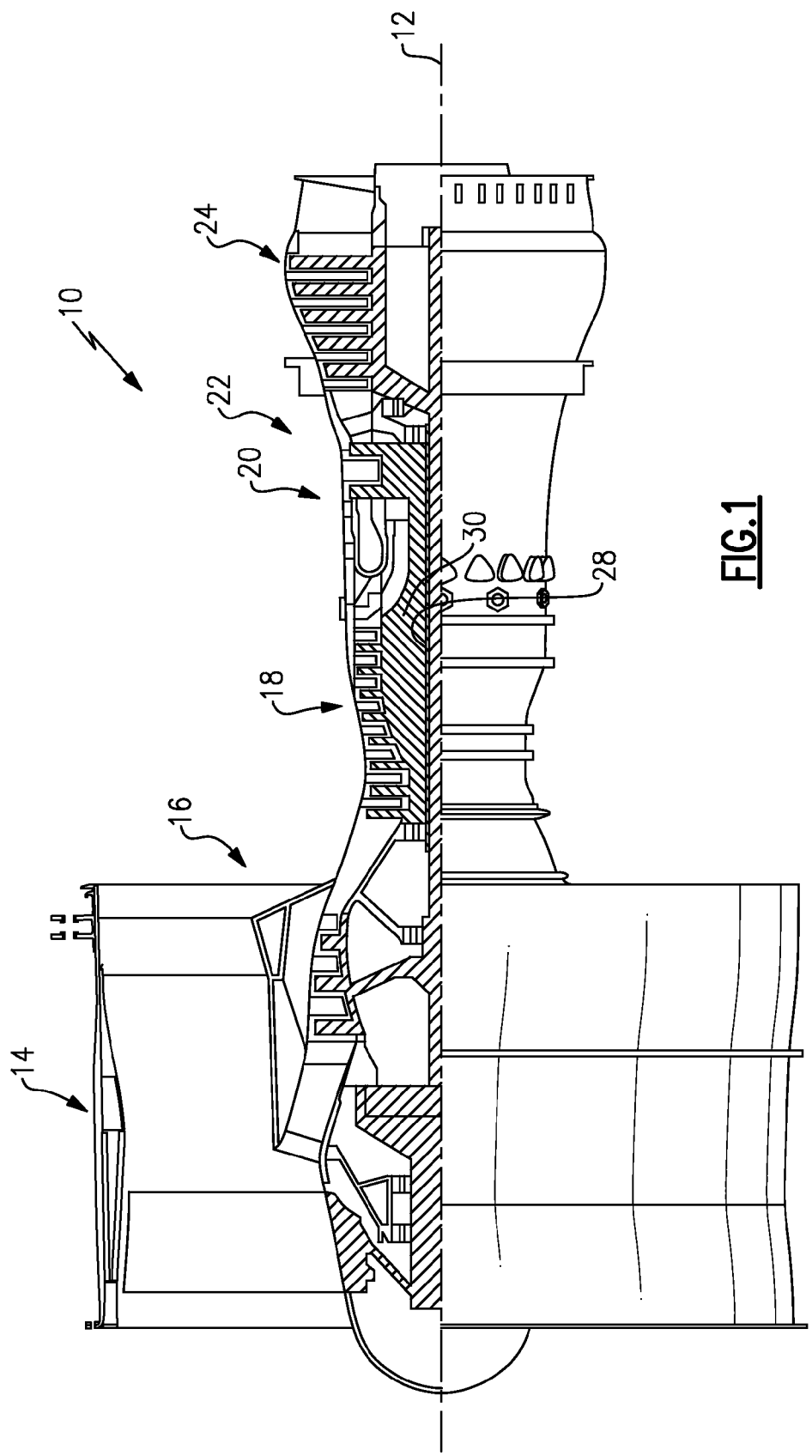
FIG. 1 shows a sectional view of an example gas turbine engine.

Referring to FIG. 1, an example turbomachine, such as a gas turbine engine 10, is circumferentially disposed about an axis 12. The gas turbine engine 10 includes a fan section 14, a low-pressure compressor section 16, a high-pressure compressor section 18, a combustor section 20, a high-pressure turbine section 22, and a low-pressure turbine section 24. Other turbomachines include more or fewer sections.

During operation, air is compressed in the low-pressure compressor section 16 and the high-pressure compressor section 18. The compressed air is mixed with fuel and burned in the combustor section 20. The products of combustion are expanded across the high-pressure turbine section 22 and the low-pressure turbine section 24.

A rotor 28 extends from the low-pressure turbine section 24 to the low-pressure compressor section 16. The low-pressure turbine section 24 rotatably drives the low-pressure compressor section 16 via the rotor 28.

A rotor 30 extends from the high-pressure turbine section 22 to the high-pressure compressor section 18. The high-pressure turbine section 22 rotatably drives the high-pressure compressor section 18 via the rotor 30.

The examples described in this disclosure are not limited to the two-spool gas turbine architecture described, and may be used in other architectures, such as a single-spool axial design, a three-spool axial design, and still other architectures. That is, there are various types of gas turbine engines, and other turbomachines, that can benefit from the examples disclosed herein.

Figure 2:
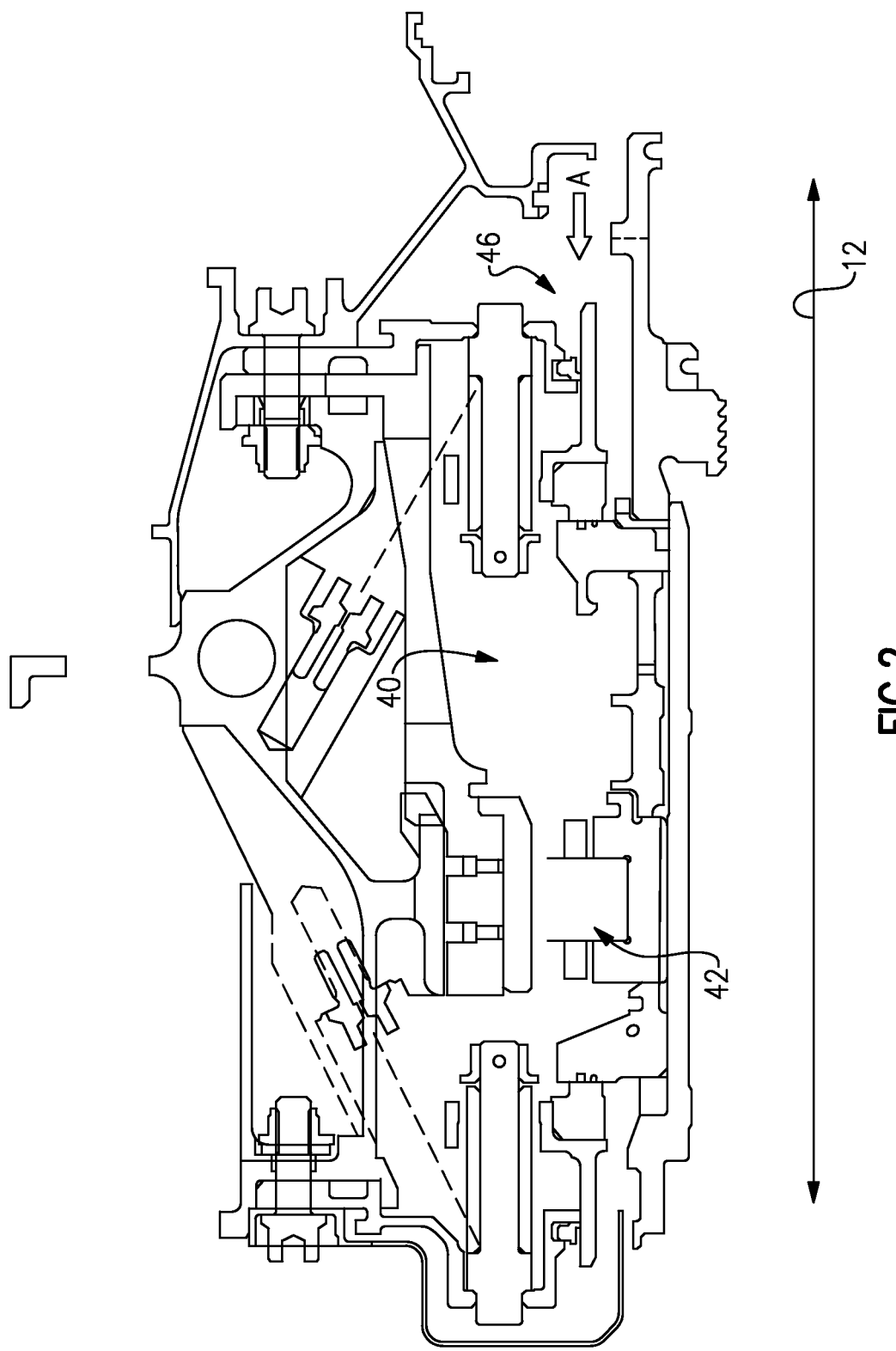
FIG. 2 shows a close-up view of a bearing compartment in the FIG. 1 engine.

Referring now to FIGS. 2-4 with continuing reference to FIG. 1, a bearing compartment 40 houses bearing arrangements 42 that rotatably support one or both of the rotors 28 and 30. Lubricant is used within the bearing compartment 40 to lubricate and cool the bearing arrangements 42. Lubricant may ignite if exposed to high levels of thermal energy.

A secondary seal assembly 46 restricts flow of both relatively hot, high-pressure air A into the bearing compartment 40 and oil out of bearing compartment 40. The core flow path of the engine 10 may include the hot, high-pressure air as is known. The secondary seal assembly 46 thus maintains the temperatures inside the bearing compartment 40 below a desired level at the same time allowing main shaft seal assembly 52 to move axially.

The example secondary seal assembly 46 includes a contracting ring seal 48, a first support 50, and a second support 52. The first support 50 is radially outboard the second support 52 relative to the axis 12 without any contact. The contracting ring seal 48, the first support 50, and the second support 52 extend circumferentially about the axis 12. The contracting ring seal 48 is received within a circumferentially extending groove 56 established within the first support 50. The example secondary seal 46 is located in the bearing compartment 40 and contacts the second support 52. The main shaft seal assembly includes the second support 52, which contacts the rotating part attached to the engine main shafts.

In this example, the first support 50 and the second support 52 are made of a titanium or steel material. The ring seal 48 is a steel, such as AMS7310, for example.

The ring seal 48 contacts a contact face 58 of the first support 50 and a contact face 60 of the second support 52. In this example, the contact between the ring seal 48 and the contact faces 58 and 60 limits movement of the relatively hot, high-pressure air A from a first axial side 62 of the ring seal 48 to a second opposite axial side 64 of the ring seal 48 and groove 56 and limits movement of oil out of the bearing compartment 40.

The example contracting ring seal 48 includes a base portion 66 and a protrusion 68 that extends from the base portion 66. In this example, a portion of the base 66 is the portion of the contracting ring seal 48 that is received within the groove 56. The protrusion 68 extends from the base portion 66 toward the axis 12 when the ring seal 48 is positioned within the groove 56.

When in the sealing position, a sealing surface 70 of the protrusion touches the contact face 60 of the second support 52 due to self-contracting and/or air pressure differences. In this example, the width $W_1$ of the sealing surface 70 is smaller than the width $W_2$ of the base 66. In this example, the protrusion 68 is positioned on an axially forward portion of the ring seal 48 relative to a direction of flow through the engine 10.

The ring seal 48 also includes a sealing surface 72 that contacts the contact face 58 when the ring seal 48 is in the sealing position. The protrusion 68 establishes the sealing surface 70, and at least some of the sealing surface 72, in this example.

In this example, the contact face 60 of the second support 52 is an axially extending surface that faces away from the axis 12. The sealing surface 70 is an axially extending surface that faces toward the axis 12. The contact face 58 is a radially extending surface that faces an aft end of the engine 10. Also, the sealing surface 72 is a radially extending surface that faces a forward end of the engine 10.

During operation, when air A is at high pressure, the relatively hot, high-pressure air A flows into the groove 56 through a gap established between the ring seal 48 and the second support 52. The air A biases the ring seal 48 into the sealing position. That is, the air A forces the sealing surface 70 radially inward against the contact face 60, and forces the sealing surface 72 axially forward against the sealing surface 72. The ring seal 48 thus blocks flow into the gap $G_2$ between the first support 50 and the second support 52, which restricts flow from the first axial side 62 into the second axial side 64 of the groove 50 and ring seal 48.

Notably, when the ring seal 48 is in the sealing position, the ring seal 48 only contacts the first support 50 at the contact face 58. The ring seal 48 is axially spaced from the other portions of the first support 50 when the ring seal 48 is in the sealing position. In fact, no axially directed portions of the example ring seal 48 contact the first support 50 when the ring seal 48 is in the sealing position.

The example ring seal 48 includes an axially extending flange 76 (or rim) that helps maintain the position of the ring seal 48 within the groove 56. The flange 76 prevents the ring seal 48 from misassembling opposite direction. The flange 76 extends from a side of the base 66 that is opposite the protrusion 68. The flange 76 thus extends away from the sealing surface 72 so that won't fit into the groove 56 if assembled opposite direction.

Referring to FIGS. 5-6, the example contracting ring seal 48 includes a split 80. During assembly, the split 80 allows the ring seal 48 to fit into groove 56 of the first support 50 during secondary ring seal sub-assembly. The ring seal 48 is a "C"-seal in other examples. Air may move into the groove 56 through the slot 80 in addition to the gap $G_1$.

Features of the disclosed example include a contracting seal that seals against axial and radial surfaces of supports. The sealing surface of the seal faces toward the axis of the engine and radial of support. The supporting arrangement associated with the seal does not require as much space as prior art designs. The supporting arrangement is also lighter than the prior art designs.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A turbomachine ring seal assembly, comprising:
    a base that extends circumferentially about an axis, the base having an innermost diameter about the axis; and
    a protruding element extending radially inward and axially forward from the base,
        the protruding element having a first sealing surface that contacts a first support to limit movement of a fluid from a first axial side of the base to a second opposite axial side of the base, the contact between the first sealing surface and the first support at a position that is radially inside the innermost diameter of the base,
        the protruding element having a second sealing surface that contacts a second support to limit movement of the fluid from the first axial side of the base to the second opposite axial side of the base, the contact between the second sealing surface and the second support at a position that is radially inside the innermost diameter of the base,
        wherein the first sealing surface faces the axis, and the first sealing surface is transverse to the second sealing surface.

2. The turbomachine ring seal assembly of claim 1, including a flange extending axially from the base away from the second sealing surface.

3. The turbomachine ring seal assembly of claim 1, wherein the innermost diameter of the base has a first axial width, and the first sealing surface has a second axial width smaller than the first axial width.

4. A turbomachine seal assembly comprising:
    a first support that establishes a circumferential groove;
    a second support radially inboard the first support; and
    a seal having a base and a protruding element extending radially inward and axially forward from the base, the base at least partially received within the circumferential groove,
        wherein the protruding element contacts the second support to restrict flow of a fluid from a first axial side of the circumferential groove to a second opposite axial side of the circumferential groove,
        wherein the base has a single innermost diameter and the protruding element contacts a radially extending surface of the first support when the seal is in the sealing position, a contact interface between the protruding element and the first support extending from a position radially outside the single innermost diameter to a position that is radially inside the single innermost diameter.

5. The turbomachine seal assembly of claim 4, wherein the seal is configured to restrict flow of the fluid from an area outside a bearing compartment to an area inside the bearing compartment.

6. The turbomachine seal assembly of claim 4, wherein the protruding element contacts an axially extending surface of the second support when the seal is in a sealing position.

7. The turbomachine seal assembly of claim 4, wherein the base is radially spaced from the first support when the seal is in the sealing position.

8. The turbomachine seal assembly of claim 4, wherein the seal is positioned within a gas turbine engine.

9. The turbomachine seal assembly of claim 4, where in the seal is a contracting seal.

10. A turbomachine sealing method including:
positioning a seal at least partially within a circumferential groove of a first support;
supporting the seal radially inward against a second support assembly using a pressurized fluid, a self-contracting force of ring seal, or both; and
limiting flow of a fluid using the seal by contacting the first support and the second support with surfaces of a common protruding element of the seal, the protruding element extending radially inward and axially forward from a base of the seal, the contact between the first support and the second support at positions that are radially inside a radially innermost diameter of the base.

11. The turbomachine sealing method of claim 10, wherein the limiting includes limiting flow of a fluid into a bearing compartment of the turbomachine.

12. The turbomachine ring seal assembly of claim 1, wherein the second seal surface interfaces directly with the sealing surface that faces the axis at a circumferentially extending corner of the protruding element.

13. The turbomachine seal assembly of claim 4, wherein the protruding element contacts an axially extending surface of the second support when the seal is in the sealing position, and both the radially extending surface contacted by the protrusion and the axially extending surface contacted by the protruding element have portions that are closer to the second axial side of the circumferential groove than the base.

14. The turbomachine sealing method of claim 10, the contacting of the first support is at a position that is upstream from the base of the seal relative to a direction of flow through the turbomachine.

15. The turbomachine sealing method of claim 10, including biasing the protruding element axially forward within the turbomachine using the pressurized fluid.

16. The turbomachine ring seal assembly of claim 1, wherein the first and second sealing surfaces of the protruding element extend circumferentially continuously about the axis from a first side of a split to an opposing second side of the split, the split extending radially through both the base and protruding element.

17. The turbomachine seal assembly of claim 4, wherein the protruding element extends circumferentially continuously about the axis from a first side of a split to an opposing second side of the split, the split extending radially through both the base and protruding element.

18. The turbomachine sealing method of claim 13, wherein contact between the protruding element and the axially extending surface, and contact between the protruding element and the radially extending surface is circumferentially continuous about the axis from a first side of a split to an opposing second side of the split, the split extending radially through both the base and protruding element.

19. The turbomachine seal assembly of claim 4, wherein the first support and the second support are components of a turbomachine.

20. The turbomachine seal assembly of claim 4, further comprising a flange extending axially from the base away from the second sealing surface.

21. The turbomachine sealing method of claim 10, wherein the seal further comprises a flange extending from a base portion of the seal in an axial direction away from the common protruding element of the seal.

* * * * *